(12) United States Patent
Baldreich

(10) Patent No.: US 11,384,881 B2
(45) Date of Patent: Jul. 12, 2022

(54) PLUG-IN COUPLING SEAL FOR A FLUID LINE OF A DRIVE MOTOR

(71) Applicant: Henn GmbH & Co KG, Dornbirn (AT)

(72) Inventor: Wolfgang Baldreich, Dornbirn (AT)

(73) Assignee: Henn GmbH & Co KG, Dornbirn (AT)

( * ) Notice: Subject to any disclaimer, the term of this patent is extended or adjusted under 35 U.S.C. 154(b) by 700 days.

(21) Appl. No.: 16/343,429

(22) PCT Filed: Oct. 18, 2017

(86) PCT No.: PCT/AT2017/060269
§ 371 (c)(1),
(2) Date: Apr. 19, 2019

(87) PCT Pub. No.: WO2018/071937
PCT Pub. Date: Apr. 26, 2018

(65) Prior Publication Data
US 2019/0316680 A1    Oct. 17, 2019

(30) Foreign Application Priority Data

Oct. 20, 2016   (AT) .............................. A 50953/2016

(51) Int. Cl.
*F16J 15/3232*       (2016.01)
*F16L 37/088*        (2006.01)
*F16L 21/03*         (2006.01)

(52) U.S. Cl.
CPC .......... *F16L 37/088* (2013.01); *F16J 15/3232* (2013.01); *F16L 21/03* (2013.01)

(58) Field of Classification Search
CPC ....... F16L 17/02; F16L 17/025; F16L 17/032; F16L 17/06; F16L 17/067; F16L 21/03;
(Continued)

(56) References Cited

U.S. PATENT DOCUMENTS 3,315,970 A *  4/1967  Holoway ............... F16L 17/035
                                                      285/345
4,194,750 A *  3/1980  Sovish .................... F16L 55/11
                                                      277/944

(Continued)

FOREIGN PATENT DOCUMENTS

AT    12 491 U1    6/2012
AT    14 083 U1    4/2015
(Continued)

OTHER PUBLICATIONS

International Search Report in PCT/AT2017/060269, dated Mar. 5, 2018.
(Continued)

*Primary Examiner* — Aaron M Dunwoody
(74) *Attorney, Agent, or Firm* — Collard & Roe, P.C.

(57) ABSTRACT

The invention relates to a plug-in coupling seal (1) for a fluid line of a drive motor, wherein the plug-in coupling seal (1) has an outer surface (5) for accommodation in a first coupling part (11) and an inner surface (7) for contact against a second coupling part (12) to be pushed in insertion direction (16) into the first coupling part (11). A microstructuring (22) having protruding structuring elements (23) for reduction of the resistance of the second coupling parts (12) to insertion into the first coupling part (11) is formed on the inner surface (7).

19 Claims, 5 Drawing Sheets

(58) Field of Classification Search
CPC ...... F16J 15/022; F16J 15/025; F16J 15/3204; F16J 15/3284
USPC .................................................. 285/374, 110
See application file for complete search history.

(56) References Cited

U.S. PATENT DOCUMENTS

| | | |
|---|---|---|
| 4,487,421 A | 12/1984 | Housas et al. |
| 4,664,421 A | 5/1987 | Jones |
| 5,533,708 A | 7/1996 | Atkinson et al. |
| 5,855,399 A | 1/1999 | Profunser |
| 7,918,463 B2 | 4/2011 | Arai et al. |
| 9,574,665 B2 | 2/2017 | Dengler |
| 2008/0191481 A1 | 8/2008 | Hartmann |
| 2011/0302916 A1 | 12/2011 | Miller et al. |
| 2013/0154192 A1 | 6/2013 | Sitko et al. |
| 2017/0045140 A1 | 2/2017 | Dop et al. |
| 2017/0074330 A1 | 3/2017 | Zhang et al. |
| 2017/0146159 A1 | 5/2017 | Hartmann |

FOREIGN PATENT DOCUMENTS

| | | |
|---|---|---|
| CA | 1318904 C | 6/1993 |
| DE | 35 13 189 A1 | 10/1986 |
| DE | 696 36 179 T2 | 5/2007 |
| DE | 10 2013 200 986 A1 | 8/2013 |
| DE | 11 2014 006 363 T5 | 11/2016 |
| GB | 1 350 593 A | 4/1974 |
| GB | 2 296 070 A | 6/1996 |
| JP | S63-178669 U | 11/1988 |
| JP | H08-184377 A | 7/1996 |
| JP | H11-30370 A | 2/1999 |
| JP | 2001-355740 A | 12/2001 |
| JP | 2003-074710 A | 3/2003 |
| JP | 2003-199824 A | 7/2003 |
| JP | 2004-138091 A | 5/2004 |
| JP | 2004-218672 A | 8/2004 |
| JP | 2007-533928 A | 11/2007 |
| JP | 2010-281404 A | 12/2010 |
| KR | 1020140047017 A | 4/2014 |
| WO | 2005/103551 A1 | 11/2005 |
| WO | 2006/037967 A1 | 4/2006 |
| WO | 2009/094679 A1 | 8/2009 |
| WO | 2015/161333 A1 | 10/2015 |

OTHER PUBLICATIONS

Letter of Austrian Patent Attorney to European Patent Office in PCT/AT2017/060269, dated Aug. 2, 2018, with English translation of relevant parts.

* cited by examiner

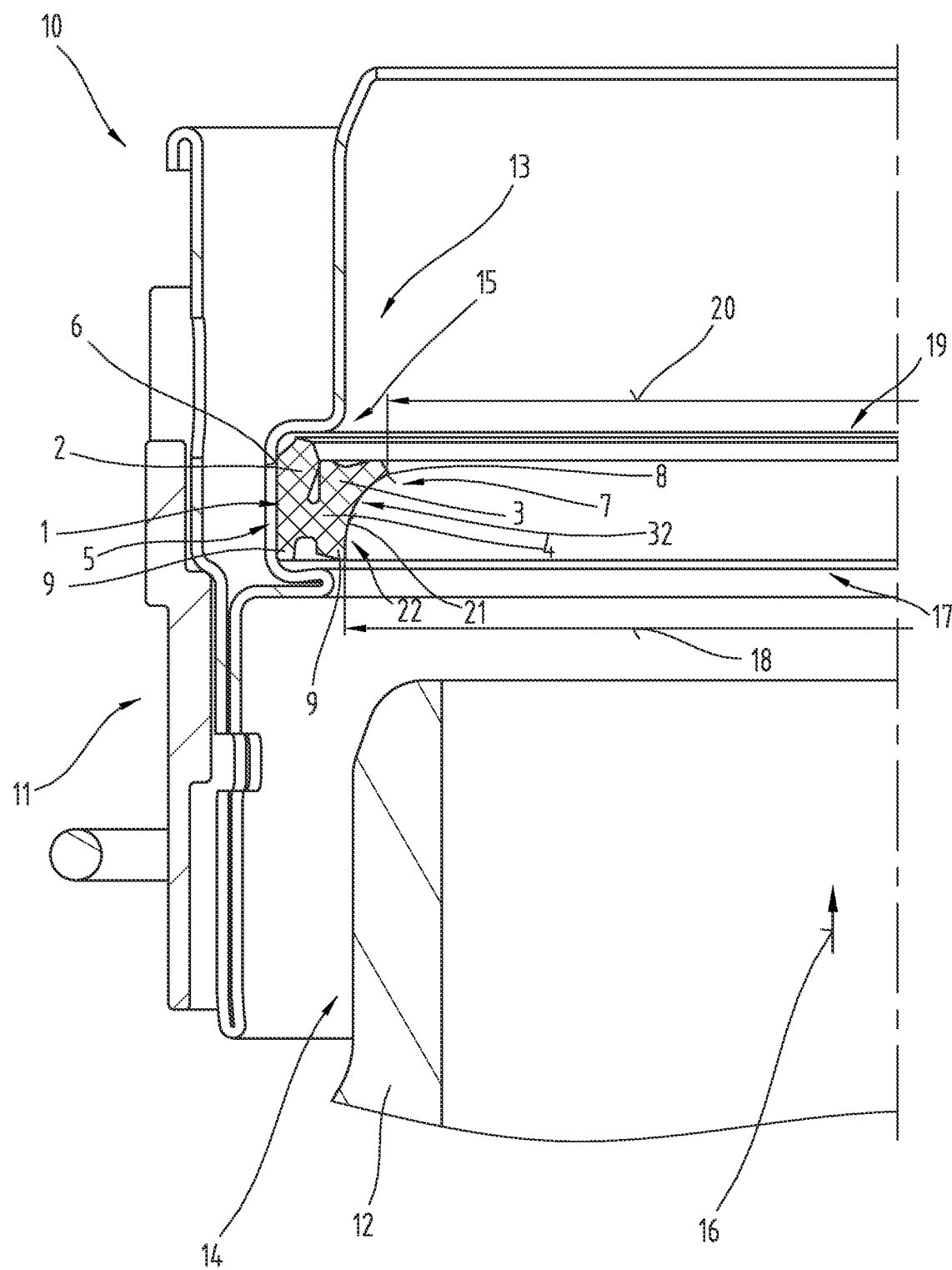

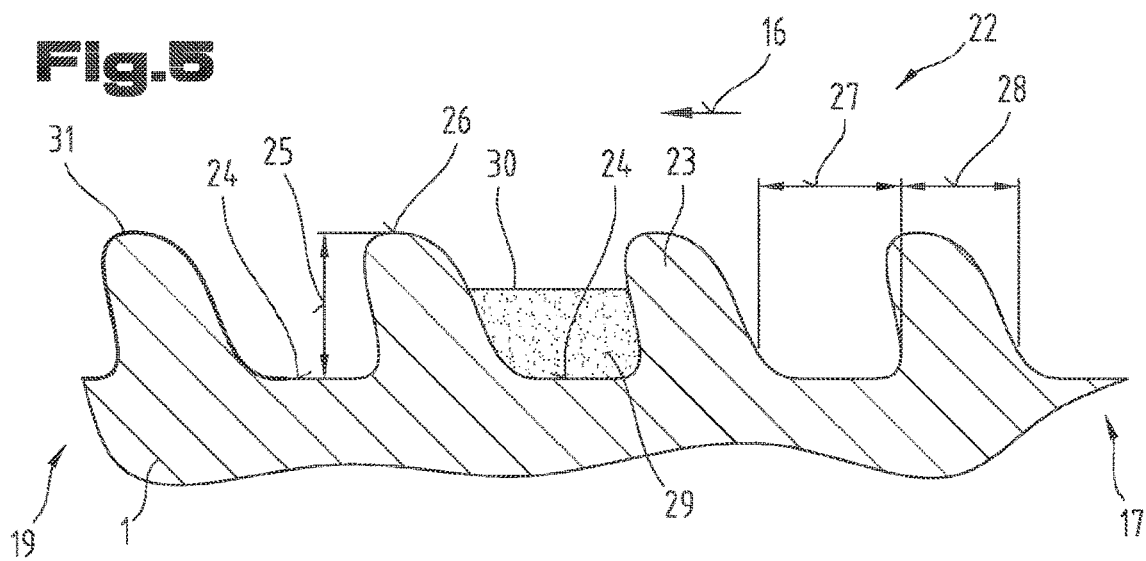
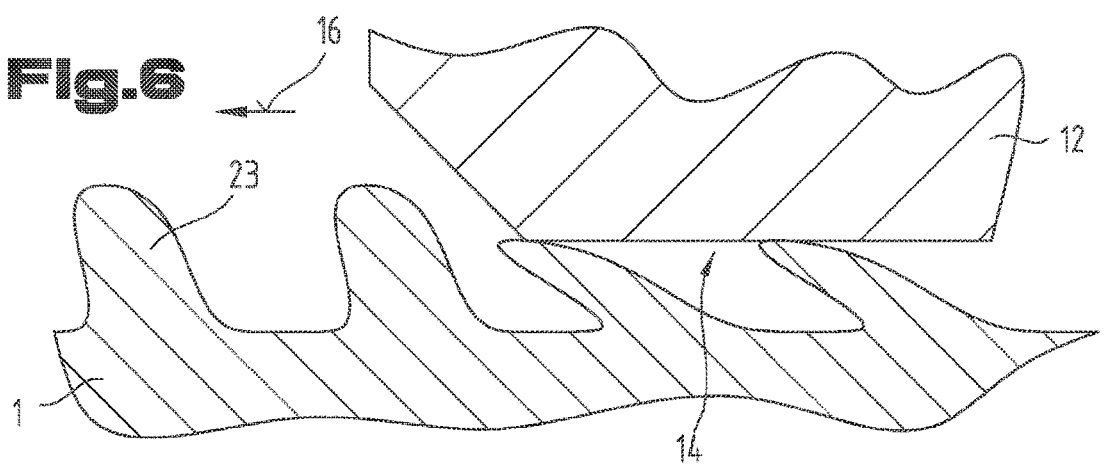
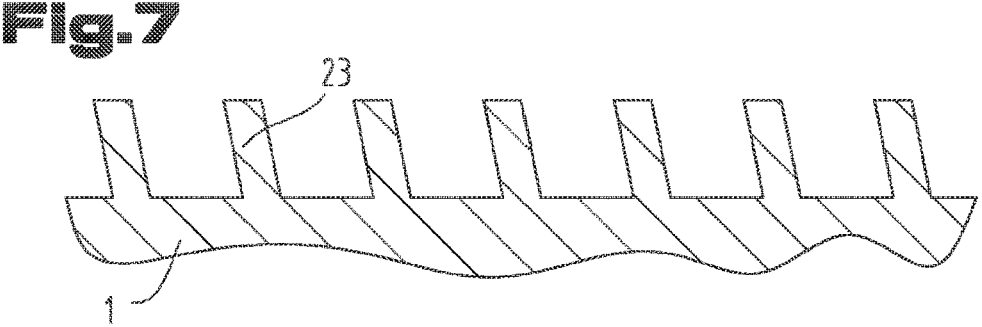
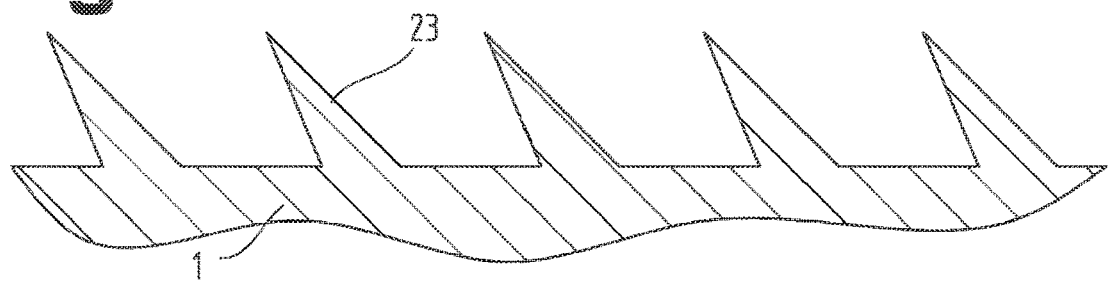

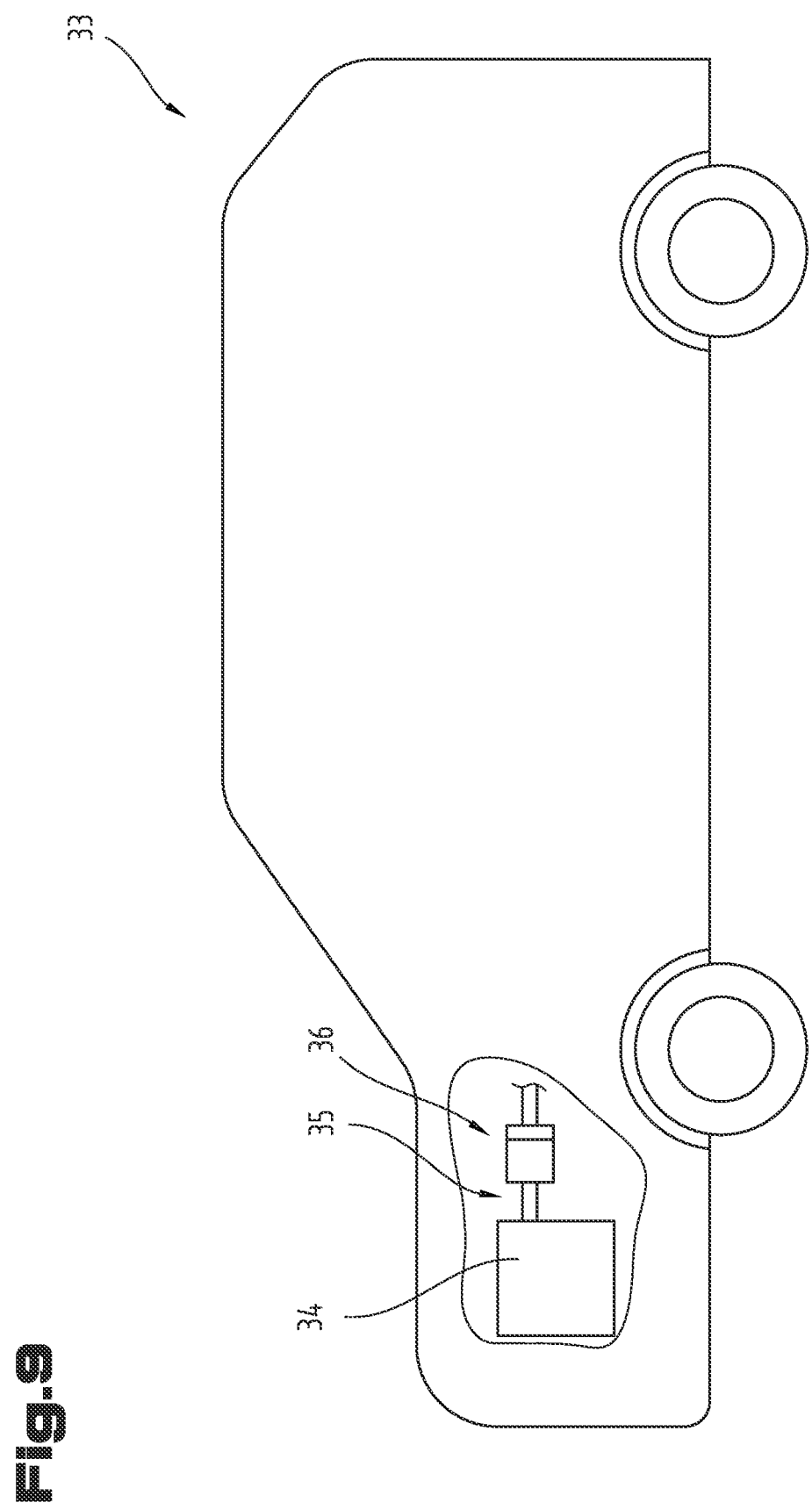

PLUG-IN COUPLING SEAL FOR A FLUID LINE OF A DRIVE MOTOR

CROSS REFERENCE TO RELATED APPLICATIONS

This application is the National Stage of PCT/AT2017/060269 filed on Oct. 18, 2017, which claims priority under 35 U.S.C. § 119 of Austrian Application No. A 50953/2016 filed on Oct. 20, 2016, the disclosure of which is incorporated by reference. The international application under PCT article 21(2) was not published in English.

BACKGROUND OF THE INVENTION

1. Field of the Invention

The invention relates to a plug-in coupling seal for a fluid line of a drive motor.

2. Description of the Related Art

From AT 12 491 U1 and AT 14 083 U1, seals are known for a plug-in coupling in an air-intake line of an internal combustion engine.

The seals known from AT 12 491 U1 and AT 14 083 U1 have the disadvantage that the coupling parts with which the seal interacts are joinable only by application of a large axial force.

SUMMARY OF THE INVENTION

The task of the present invention was to overcome the disadvantages of the prior art and to provide a plug-in coupling seal that is easy to join.

This task is accomplished by a device according to the claims.

According to the invention, a plug-in coupling seal is designed for a fluid line, especially for an air-intake line, of a drive motor. The plug-in coupling seal is designed for accommodation between a first coupling part and a second coupling part to be pushed in insertion direction into the first coupling part. The plug-in coupling seal has a contact face, which is designed for contact against the first coupling part and/or against the second coupling part. A microstructuring having protruding structuring elements for reduction of the resistance of the two coupling parts to joining is formed at least in regions on the contact face.

It is of advantage for the plug-in coupling seal according to the invention that, surprisingly, the friction at the inner surface of the plug-in coupling seal can be reduced by the microstructuring and thereby the resistance to insertion of the second coupling part into the plug-in coupling seal can be reduced. Beyond this, the sealing effect of the plug-in coupling seal can be improved by the microstructuring.

In particular, it may be provided that, on the plug-in coupling seal, an outer surface is formed for accommodation in a first coupling part and an inner surface is formed for contact against a second coupling part to be pushed in insertion direction into the first coupling part, wherein the microstructuring having the protruding structuring elements for reduction of the resistance of the two coupling parts to joining is formed on the inner surface. In particular, it may be advantageous for plug-in coupling seals designed in such a manner when the necessary joining force can be reduced.

Furthermore, it may be expedient when the protruding structuring elements of the microstructuring are designed in the form of several at least partly and especially completely circumferential ribs. It is of advantage in this context that such completely circumferential ribs improve the properties, described above, of the plug-in coupling seal.

Furthermore, it may be provided that the protruding structuring elements have a height of between 10 μm and 900 μm, especially between 40 μm and 400 μm, preferably between 80 μm and 200 μm. In this situation, it is surprising that especially structuring elements having such a height have a particularly good sliding property.

Beyond this, it may be provided that a free space of between 10 μm and 900 μm, especially between 40 μm and 400 μm, preferably between 100 μm and 200 μm is formed between the protruding structuring elements. In this situation, it is surprising that structuring elements having such a free space have a particularly good sliding property.

A manifestation is also advantageous according to which it may be provided that the protruding structuring elements have a width of between 5 μμm and 300 μm, especially between 10 μm and 200 μm, preferably between 30 μm and 100 μm. In this situation, it is surprising that especially structuring elements having such a width have a particularly good sliding property.

According to a further development, it is possible that the protruding structuring elements are formed in a manner bent in insertion direction. Stated in other words, it may be provided that a head region of the structuring elements is displaced further in insertion direction than a foot region of the structuring elements. In this situation, it is of advantage that thereby the sliding properties of the microstructuring are further improved.

Furthermore, it may be expedient when a lubricant is disposed between the protruding structuring elements. In this situation, it is of advantage that joinability of the plug-in coupling seal can be further improved by means of the lubricant.

Beyond this, it may be provided that several protruding structuring elements are disposed one after the other in wavy manner. In this situation, it is of advantage that the sliding property of the microstructuring may be further improved by the provision of several structuring elements.

Furthermore, it may be provided that the inner surface of the plug-in coupling seal on which the protruding structuring elements are disposed extends between a first longitudinal end of the plug-in coupling seal having a first diameter and a second longitudinal end of the plug-in coupling seal having a second diameter, wherein the second diameter is smaller than the first diameter and a transition radius, which extends between the first longitudinal end of the plug-in coupling seal and the second longitudinal end of the plug-in coupling seal, is formed on the inner surface. Due to this measure, the insertion of the second coupling part into the plug-in coupling seal is further improved.

Furthermore, it may be provided that a coating, by which the sliding behavior of the microstructuring may be further improved, is formed on the contact face.

Beyond this, it may be provided that cavities, in which a lubricant is disposed, are formed in the plug-in coupling seal. The cavities may be formed, for example, in the material of the plug-in coupling seal. In particular, it may be provided that the cavities, in which the lubricant is disposed, are designed in the form of pores, for example. Upon squeezing of the plug-in coupling seal during the joining of the coupling parts, the cavities may be collapsed and in the process the lubricant be released.

In a first embodiment variant, it may be provided that the cavities are designed in the form of capillaries, which are open toward the surface. In a second embodiment variant, it may be provided that the cavities are designed in the form of closed chambers or pores, which burst upon exertion of pressure.

Furthermore, a motor vehicle comprising: a drive motor, an air-intake line of the drive motor and a plug-in coupling in the air-intake line of the drive motor is formed, wherein the plug-in coupling has a first coupling part having a plug-in coupling seal received therein and a second coupling part inserted into the first coupling part. The plug-in coupling seal is designed according to one aspect of the invention.

BRIEF DESCRIPTION OF THE DRAWINGS

For better understanding of the invention, it will be explained in more detail on the basis of the following figures.

Therein, respectively in greatly simplified schematic diagrams,

FIG. 3 shows a sectional diagram of a plug-in coupling seal received in a first coupling part;

FIG. 5 shows a schematic detail view in a sectional diagram of an inner surface of the plug-in coupling seal;

FIG. 6 shows a schematic detail view in a sectional diagram of the inner surface of the plug-in coupling seal, wherein the second coupling part has been pushed partly into the plug-in coupling seal;

FIG. 7 shows a schematic detail view in a sectional diagram of an inner surface of the plug-in coupling seal having rectangular structure elements;

FIG. 8 shows a schematic detail view in a sectional diagram of an inner surface of the plug-in coupling seal having sharply tapering structure elements; and FIG. 9 shows a motor vehicle comprising a drive motor, an air-intake line of the drive motor, and a plug-in coupling.

DETAILED DESCRIPTION OF THE PREFERRED EMBODIMENTS

By way of introduction, it is pointed out that like parts in the differently described embodiments are denoted with like reference symbols or like structural-part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

Figure 1:
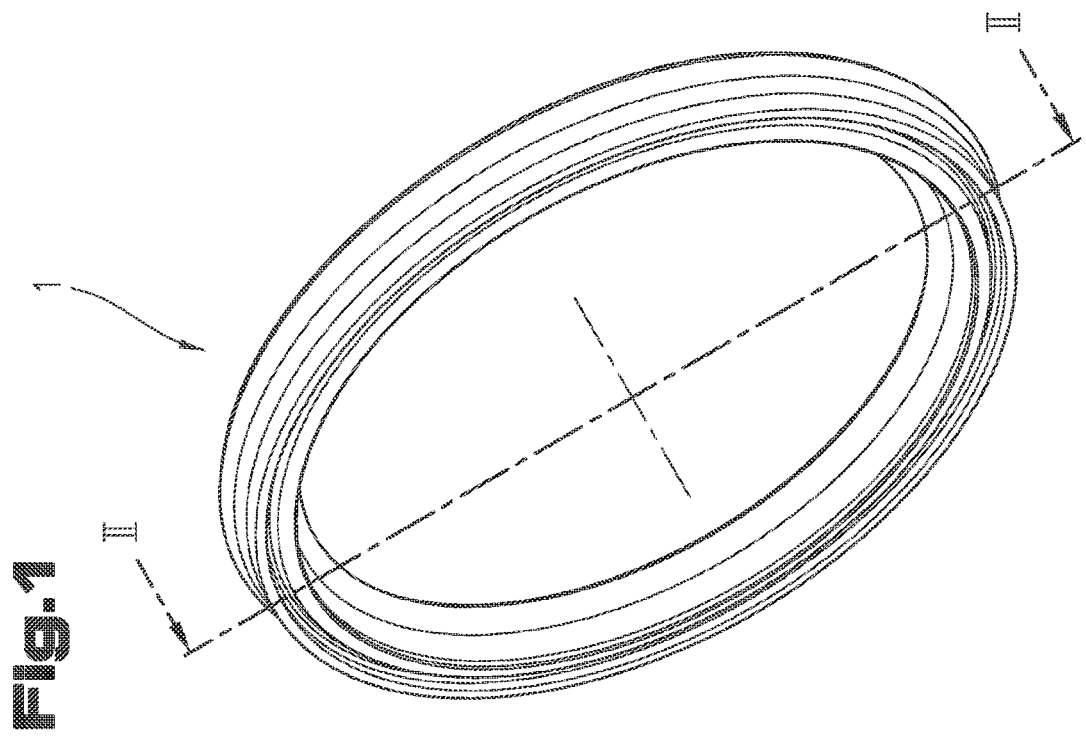
FIG. 1 shows a perspective view of a first exemplary embodiment of a plug-in coupling seal.

FIG. 1 shows an overhead view of a first exemplary embodiment of a plug-in coupling seal 1, not built in, which is constructed as a sealing ring. Before the exemplary embodiments according to the invention are discussed in detail, it must be pointed out that the plug-in coupling seal 1 according to the invention not only may be constructed annularly or rotationally symmetrically but also, depending on configuration of the structural parts to be connected to one another and if necessary sealed relative to one another, may be adapted to their shape. Thus the plug-in coupling seal 1 may also have, for example, a rectangular, an oval or another shape.

Figure 2:
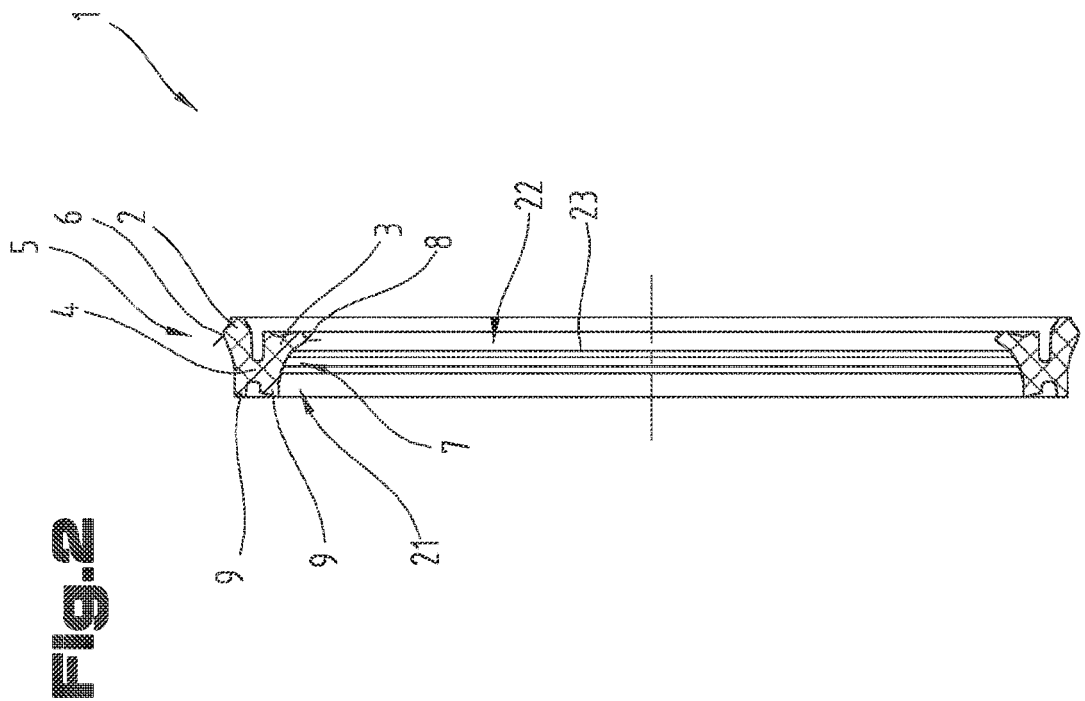
FIG. 2 shows a sectional diagram of a plug-in coupling seal according to the section line II-II in FIG. 1.

FIG. 2 shows a section along the section line II-II indicated in FIG. 1.

As is evident from FIG. 2, it may be provided that the plug-in coupling seal 1 has a first sealing lip 2 and a second sealing lip 3, which are connected to one another in a sealing-lip base 4.

Furthermore, it is provided that an outer surface 5 is formed on the plug-in coupling seal 1. In particular, it may be provided that the first sealing lip 2 forms a part of the outer surface 5, wherein a first sealing face 6 may be formed on the first sealing lip 2.

Moreover, it is provided that an inner surface 7 is formed on the plug-in coupling seal 1. In particular, it may be provided that the second sealing lip 3 forms a part of the inner surface 7, wherein a second sealing face 8 may be formed on the second sealing lip 3.

Furthermore, it may be provided that the plug-in coupling seal 1 respectively has a dirt-protection lip 9 on the side of the sealing-lip base 4 turned away from the sealing lips 2, 3. These dirt-protection lips 9 act to prevent dirt from outside from penetrating into the region of the sealing faces 6, 8.

FIG. 3 shows, in a sectional diagram, an exemplary embodiment of a plug-in coupling 10, which preferably is built into an air-intake line of a motor vehicle having an internal combustion engine. The plug-in coupling 10 is used in particular for connection of two air hoses in coupled manner in the air-intake line. The plug-in coupling 10 may be used, for example, for connection of two air hoses in an intake region upstream from a turbocharger, or for connection of two air hoses in a pressure region between the turbocharger and the internal combustion engine. For example, the plug-in coupling 10 may be used as the port for an air hose on the turbocharger.

Furthermore, it may also be provided that the plug-in coupling 10 is used, for example, in a cooling-water line, an oil line or another media line in a motor vehicle.

The plug-in coupling 10 comprises a first coupling part 11 and second coupling part 12, wherein, in the built-in condition, the plug-in coupling seal 1 is received between the two coupling parts 11, 12 and it seals these.

In particular, it may be provided that the plug-in coupling seal 1 is received in the first coupling part 11. The second coupling part 12 may be designed for insertion into the first coupling part 11. In particular, it is then provided that the plug-in coupling seal 1 is disposed between an inner side 13 of the first coupling part 11 and an outer side 14 of the second coupling part 12 and used for sealing of the two coupling parts 11, 12.

Preferably, it is provided that a groove 15, in which the plug-in coupling seal 1 is received, is formed on the inner side 13 of the first coupling part 11. In particular, the outer surface 5 of the plug-in coupling seal 1 cooperates with the groove 15.

In FIG. 3, the coupling parts 12, 13 are situated in an as yet non-joined position, wherein the plug-in coupling seal 1 is then situated in its basic position. The two coupling parts 12, 13, which are to be connected to one another and sealed relative to one another, are formed in tubular manner in the shown exemplary embodiment. Specifically, the first coupling part 11 is a bush and the second coupling part 12 is a corresponding male mating piece of a pluggable pipe connection. In this exemplary embodiment, the first coupling part 11 is constructed as a shaped sheet-metal part wherein the groove 15 is formed in this shaped sheet-metal part.

The groove 15 secures the plug-in coupling seal 1 in its position when the second coupling part 12 constructed as a male mating piece is pushed in insertion direction 16 into the first coupling part 11. The position of the plug-in coupling seal 1 is then secured in that the plug-in coupling seal 1 is received in form-fitting manner in the groove 15.

Furthermore, it may be provided that the plug-in coupling seal 1 has a first longitudinal end 17 having a first diameter 18 and a second longitudinal end 19 having a second diameter 20, wherein the second diameter 20 is smaller than the first diameter 18. Furthermore, a transition radius 21, which extends between the first longitudinal end 17 of the plug-in coupling seal 1 and the second longitudinal end 19 of the plug-in coupling seal 1, may be formed on the inner surface 7. Stated in other words, the plug-in coupling seal 1 also has an insertion direction 16.

In particular, it is provided that the first longitudinal end 17 having the first diameter 18, viewed in insertion direction 16, is disposed in front of the second longitudinal end 19 having the second diameter 20. When the plug-in coupling seal 1 is correctly disposed in the first coupling part 11, the insertion direction 16 of the first coupling part 11 coincides with the insertion direction 16 of the plug-in coupling seal 1. In this case, the second coupling part 12 is pushed from the first longitudinal end 17 into the plug-in coupling seal 1 during the joining of the two coupling parts 11, 12.

In the as yet non-joined position according to FIG. 3, the plug-in coupling seal 1 already bears with its sealing face 6 of the first sealing lip 2 on the first coupling part 11, whereas the second sealing lip 3 does not bear on the second coupling part 12.

During installation of the plug-in coupling seal 1 in the first coupling part 11, especially in the groove 15, the plug-in coupling seal 1 is deformed and compressed so much until the round circumferential shape is made smaller and compressed such that the plug-in coupling seal 1 can be inserted into the groove 15. At the end of this installation process, the plug-in coupling seal 1 lying in the groove 15 is able to relax again and deform back approximately to its completely unloaded starting condition. In the process, the first sealing lip 2 remains slightly deformed and conforms with its sealing face 6 to the first coupling part 11, so that this is contacted completely circumferentially by the plug-in coupling seal 1. The force necessary to press the sealing face 6 against the first coupling part 11 is achieved by the internal stresses caused in the plug-in coupling seal 1 due to the deformation.

Figure 4:
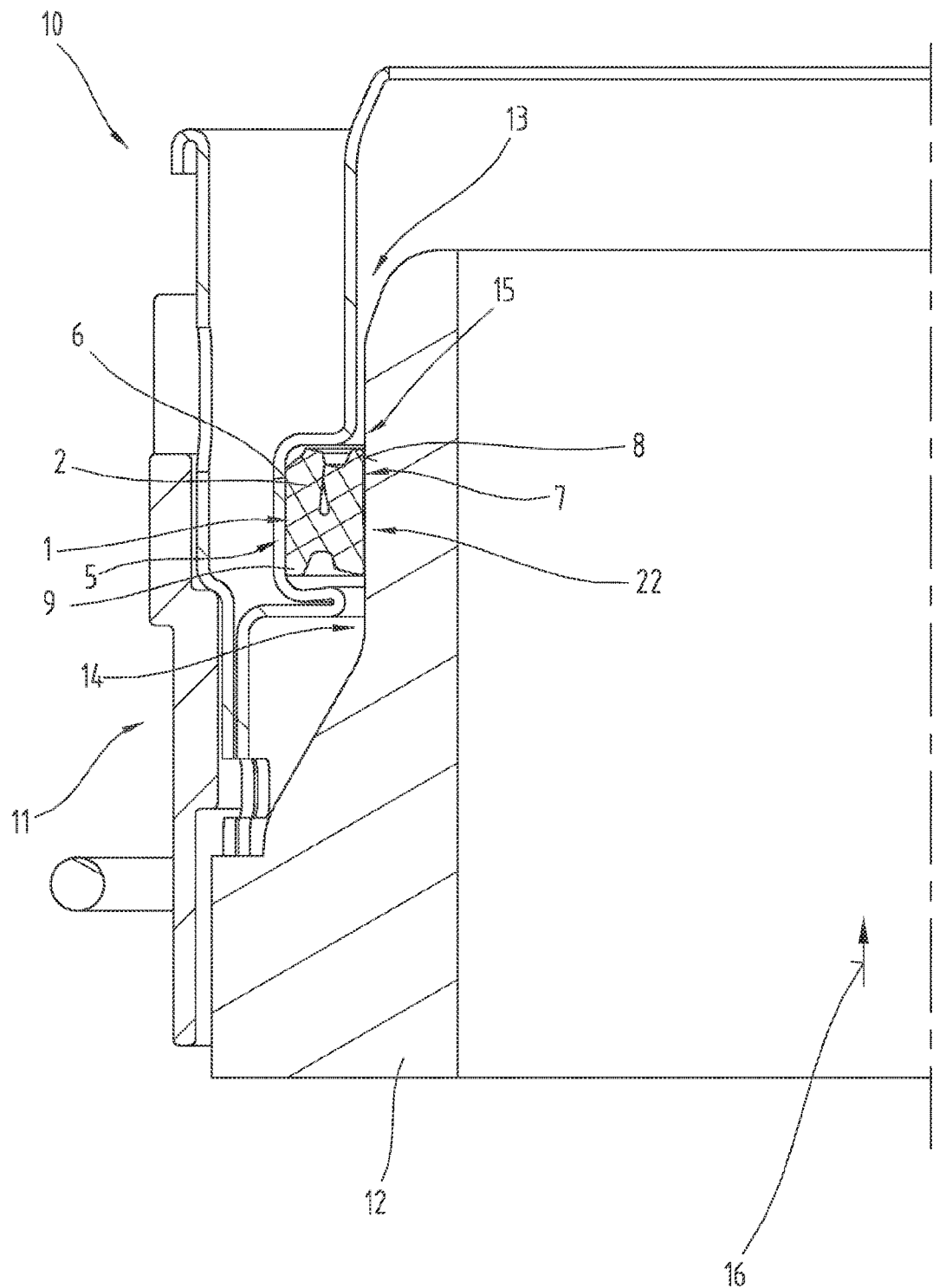
FIG. 4 shows a sectional diagram of a plug-in coupling seal received in a first coupling part, wherein a second coupling part is joined with the first coupling part.

FIG. 4 shows the plug-in coupling seal 1 in its working position, wherein the two coupling parts 11, 12 are connected to one another with interposition of the plug-in coupling seal 1. Like reference symbols or structural-part designations, as in the foregoing figures, are used for like parts. To avoid unnecessary repetitions, the detailed description in the foregoing figures is invoked or reference is made thereto.

During the pushing-in of the second coupling part 12 into the first coupling part 11, the second sealing lip 3 of the plug-in coupling seal 1 is pressed by means of the second coupling part 12 in the direction of the first sealing lip 2, starting from the position according to FIG. 3. In the process, the outer side 14 of the second coupling part 12 slides along the inner surface 7 of the plug-in coupling seal 1.

At the end of the process of joining of the coupling parts 11, 12, the plug-in coupling seal 1 is completely deformed, so that it has attained its working position, which is illustrated in FIG. 4.

Under these conditions, it may occur in conventional plug-in coupling seals that the joining force needed for joining of the coupling parts 11, 12 will become very large. Due to the measures explained in the following description, it may result that the outer side 14 of the second coupling part 12 slides more easily along the inner surface 7 of the plug-in coupling seal 1 and thus the necessary joining force is reduced.

The reduction of the joining force may be achieved in particular in that a microstructuring 22 such as shown in FIGS. 5 to 8 is formed on a contact face 32, especially on the inner surface 7 of the plug-in coupling seal 1. The microstructuring 22 comprises at least one or more structuring elements 23, which are formed in a manner protruding relative to a base surface 24. In plug-in coupling seals 1 formed in other ways, it is naturally also possible for the contact face 32 to be disposed elsewhere on the plug-in coupling seal 1.

As is particularly evident in FIG. 2, the structuring elements 23 may be designed in the form of completely circumferential ribs. These ribs may be produced in particular by a corresponding injection molding mold having corresponding recesses. A height 25 of the structuring element 23 is defined by the spacing between the base surface 24 and a tip face 26 of the structuring element 23.

A free space 27 between the structuring elements 23 is preferably measured close to the base surface 24. The free space 27 defines the intermediate spacing of two structuring elements 23 relative to one another. The individual structuring elements 23 may be deformed by formation of the free space 27.

A width 28 of the structuring elements 23 is likewise preferably measured close to the base surface 24.

As is evident from FIG. 5, the structuring element 23 may be formed in a manner tapering from the base surface 24 or from the foot to the tip face 26 or head. Stated in other words, the width 28 of the structuring element 23 at the base surface 24 or foot may be larger than at the tip face 26 or head.

As is further evident from FIG. 5, it may be provided that the structuring elements 23 are bent in insertion direction 16 or the tip face 26 is pushed in insertion direction 16 relative to the base surface 24. Stated in other words, that the head region of the structuring elements 23 is displaced further in insertion direction 16 than a foot region of the structuring elements 23. Thereby it may be achieved that, during insertion of the second coupling part 12 into the plug-in coupling seal 1, the structuring elements 23 may be shifted further in the direction of plug-in direction 16.

Furthermore, it may be provided that a lubricant 29, which serves to further facilitate the introduction of the first coupling part 11 into the plug-in coupling seal 1, is disposed in the free space between the individual structuring elements 23. Furthermore, a sealant 30 may be formed, by means of which the lubricant 29 is held in position or protected from drying out. When the second coupling part 12 is pushed into the plug-in coupling seal 1, the sealant 30 is able to burst and thereby the lubricant 29 is released and thus serves for lubrication.

In an alternative embodiment variant, it may also be provided that the microstructuring 22 is applied, for example by spreading, on the inner surface 7 of the plug-in coupling seal 1.

In a further embodiment variant, it may also be provided that a coating 31, by which the sliding behavior of the microstructuring 22 may be further improved, is formed on the structuring elements 23 and/or on the base surface 24.

The coating 31 may naturally be formed on the entire surface of the plug-in coupling seal 1.

In FIG. 6, the process of pushing of the second coupling part 12 into the plug-in coupling seal 1 is illustrated, wherein the second coupling part 12 has already been pushed partly into the plug-in coupling seal 1 and therefore the structuring elements 23 of the microstructuring 22 are partly bent over. Due to the bending-over of the structuring elements 23, the pushing-in process is facilitated.

In FIG. 7, a further embodiment, which as the case may be is independent in itself, of the microstructuring 22 is shown, wherein once again like reference symbols or structural-part designations are used for like parts, as in the foregoing FIGS. 5 and 6. To avoid unnecessary repetitions, the detailed description in the foregoing FIGS. 5 and 6 is invoked or reference is made thereto.

As evident from FIG. 7, it may be provided that the structuring elements 23, viewed over their height, have an approximately equally large width 28. In particular, it may be provided that the structuring elements 23 are formed in approximately rectangular manner.

In FIG. 8, a further embodiment, which as the case may be is independent in itself, of the microstructuring 22 is shown, wherein once again like reference symbols or structural-part designations are used for like parts, as in the foregoing FIGS. 5 to 7. To avoid unnecessary repetitions, the detailed description in the foregoing FIGS. 5 to 7 is invoked or reference is made thereto.

As evident from FIG. 8, it may be provided that the structuring elements 23, viewed over their height, have a decreasing width 28. In particular, it may be provided that the structuring elements 23 are formed in sharply tapering manner.

FIG. 9 shows a motor vehicle 33 comprising: a drive motor 34, an air-intake line 35 of the drive motor 34 and a plug-in coupling 36 in the air-intake line 35 of the drive motor 34.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

LIST OF REFERENCE NUMERALS

1 Plug-in coupling seal
2 First sealing lip
3 Second sealing lip
4 Sealing-lip base
5 Outer surface
6 Sealing face of first sealing lip
7 Inner surface
8 Sealing face of second sealing lip
9 Dirt-protection lip
10 Plug-in coupling
11 First coupling part
12 Second coupling part
13 Inner side of first coupling part
14 Outer side of second coupling part
15 Groove
16 Insertion direction
17 First longitudinal end
18 First diameter
19 Second longitudinal end
20 Second diameter
21 Transition radius
22 Microstructuring
23 Structuring element
24 Base surface
25 Height of structuring element
26 Tip face
27 Free space between structuring elements
28 Width of structuring element
29 Lubricant
30 Sealant
31 Coating
32 Contact face

The invention claimed is:

1. A plug-in coupling seal for a fluid line of a drive motor; wherein the plug-in coupling seal is formed for accommodation between a first coupling part and a second coupling part to be pushed in an insertion direction into the first coupling part;
wherein the plug-in coupling seal has a contact face, which is formed for contact against the second coupling part;
wherein a microstructuring having protruding structuring elements for reduction of the resistance of the two coupling parts to joining is formed at least in regions on the contact face which is formed for contact against the second coupling part;
wherein the protruding structuring elements are formed in a manner bent in the insertion direction; and
wherein a head region of the protruding structuring elements on the contact face is displaced further in the insertion direction than a foot region of the protruding structuring elements.

2. The plug-in coupling seal according to claim 1, wherein an outer surface is formed for accommodation in a first coupling part and an inner surface is formed for contact against a second coupling part to be pushed in insertion direction into the first coupling part, wherein the microstructuring having the protruding structuring elements for reduction of the resistance of the two coupling parts to joining is formed on the inner surface.

3. The plug-in coupling seal according to claim 2, wherein the inner surface of the plug-in coupling seal on which the protruding structuring elements are disposed extends between a first longitudinal end of the plug-in coupling seal having a first diameter and a second longitudinal end of the plug-in coupling seal having a second diameter wherein the second diameter is smaller than the first diameter and a transition radius, which extends between the first longitudinal end of the plug-in coupling seal and the second longitudinal end of the plug-in coupling seal, is formed on the inner surface.

4. The plug-in coupling seal according to claim 1, wherein the protruding structuring elements of the microstructuring are designed in the form of several at least partly and especially completely circumferential ribs.

5. The plug-in coupling seal according to claim 1, wherein the protruding structuring elements have a height of between 10 μm and 900 μm.

6. The plug-in coupling seal according to claim 1, wherein a free space of between 10 μm and 900 μm is formed between the protruding structuring elements.

7. The plug-in coupling seal according to claim 1, wherein the protruding structuring elements have a width of between 5 μm and 300 μm.

8. The plug-in coupling seal according to claim 1, wherein a lubricant is disposed between the protruding structuring elements.

9. The plug-in coupling seal according to claim 1, wherein several protruding structuring elements are disposed one after the other in wavy manner.

10. The plug-in coupling seal according to claim 1, wherein a coating by which the sliding behavior of the microstructuring may be further improved, is formed at least on the contact face.

11. The plug-in coupling seal according to claim 1, wherein cavities, in which a lubricant is disposed, are formed in the plug-in coupling seal.

12. A motor vehicle comprising: a drive motor, an air-intake line of the drive motor and a plug-in coupling of the air-intake line of the drive motor, wherein the plug-in coupling has a first coupling part having a plug-in coupling seal received therein and a second coupling part inserted into the first coupling part, wherein the plug-in coupling seal is formed according to claim 1.

13. The plug-in coupling seal according to claim 1, wherein the protruding structuring elements have a height of between 40 μm and 400 μm.

14. The plug-in coupling seal according to claim 1, wherein the protruding structuring elements have a height of between 80 μm and 200 μm.

15. The plug-in coupling seal according to claim 1, wherein a free space of between 40 μm and 400 μm is formed between the protruding structuring elements.

16. The plug-in coupling seal according to claim 1, wherein a free space of between 100 μm and 200 μm is formed between the protruding structuring elements.

17. The plug-in coupling seal according to claim 1, wherein the protruding structuring elements have a width of between 10 μm and 200 μm.

18. The plug-in coupling seal according to claim 1, wherein the protruding structuring elements have a width of between 30 μm and 100 μm.

19. A plug-in coupling seal for a fluid line of a drive motor;
wherein the plug-in coupling seal is formed for accommodation between a first coupling part and a second coupling part to be pushed in an insertion direction into the first coupling part;
wherein the plug-in coupling seal has a contact face, which is formed for contact against the second coupling part;
wherein a microstructuring having protruding structuring elements for reduction of the resistance of the two coupling parts to joining is formed at least in regions on the contact face which is formed for contact against the second coupling part;
wherein the contact face is applied on an inner surface of the plug-in coupling seal;
wherein the protruding structuring elements are formed in a manner bent in an insertion direction; and
wherein a head region of the protruding structuring elements on the contact face is displaced further in the insertion direction than a foot region of the protruding structuring elements.

* * * * *